(No Model.)
C. J. SLAFTER.
STOCK CAR.
No. 244,326.　　　　　　　Patented July 12, 1881.
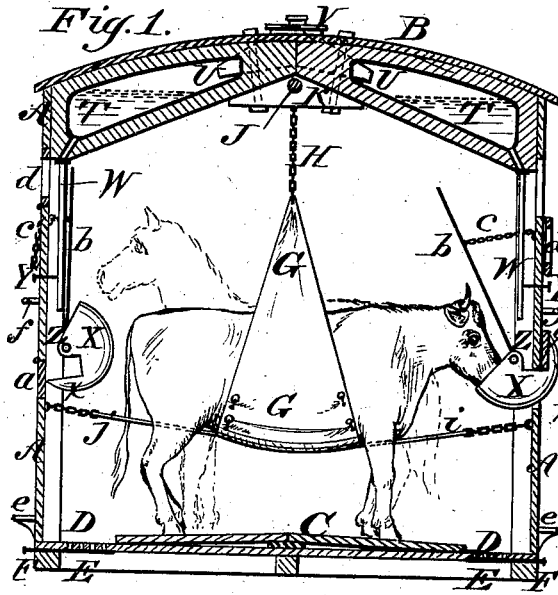
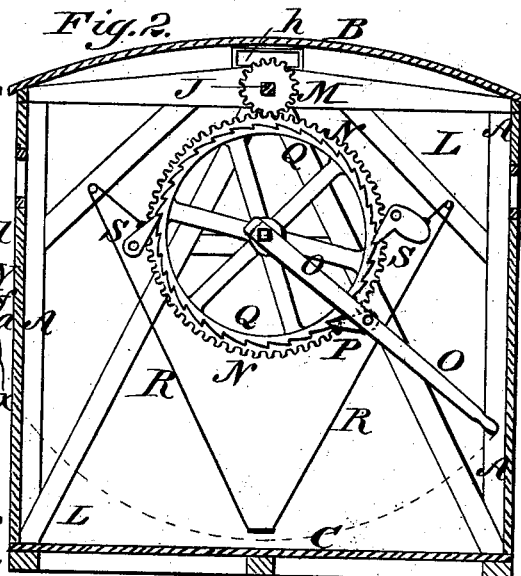
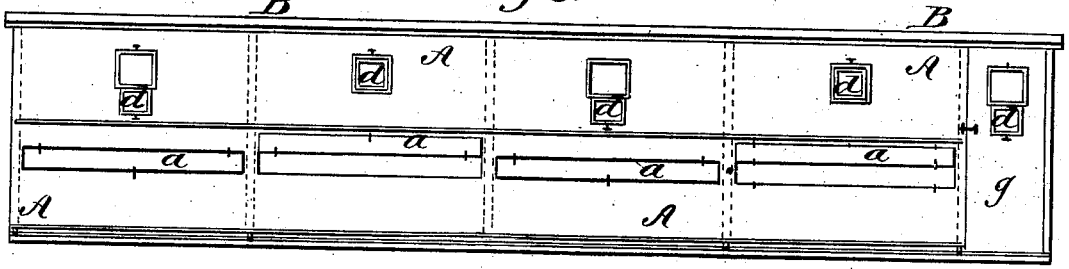
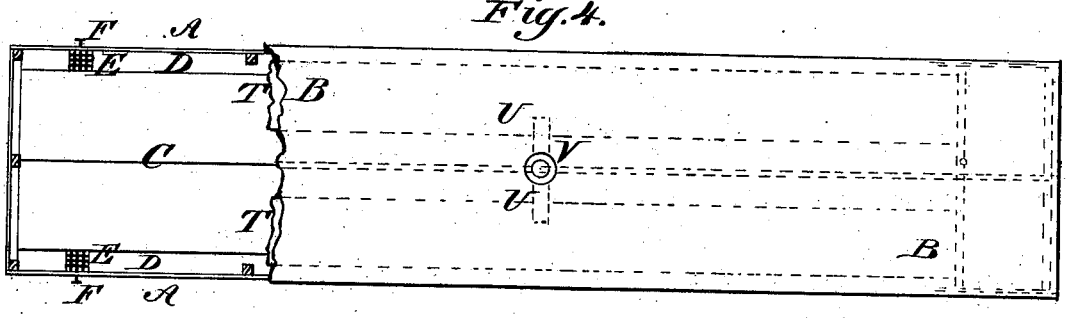
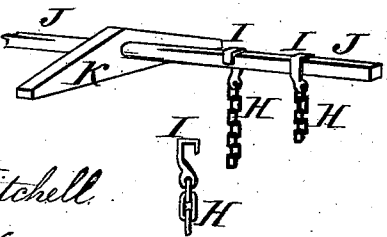
WITNESSES:
Donn J. Twitchell
C. Sedgwick
INVENTOR:
C. J. Slafter
BY Munn & Co.
ATTORNEYS.
N. PETERS. Photo-Lithographer, Washington, D. C.

UNITED STATES PATENT OFFICE.

CORODEN J. SLAFTER, OF GRAND JUNCTION, MICHIGAN.

STOCK-CAR.

SPECIFICATION forming part of Letters Patent No. 244,326, dated July 12, 1881.

Application filed February 18, 1881. (No model.)

*To all whom it may concern:*

Be it known that I, CORODEN J. SLAFTER, of Grand Junction, in the county of Van Buren and State of Michigan, have invented a new and useful Improvement in Stock-Cars, of which the following is a full, clear, and exact description.

Figure 1 is a sectional end elevation of my improvement, taken through the middle part of the car-body. Fig. 2 is a sectional end elevation of the same, taken through the end chamber of the car-body. Fig. 3 is a side elevation of the car-body. Fig. 4 is a plan view of the same, partly in section. Fig. 5 is a perspective view of a part of the hoisting-rod, its bearings, and chains. Fig. 6 is a perspective view of the bucket or trough.

Similar letters of reference indicate corresponding parts.

The object of this invention is to facilitate the transportation of animals in cars, and promote their comfort while being transported.

A represents the sides, B the roof or top, and C the floor or bottom, of a car-body. The floor C is made higher in the middle, as shown in Fig. 1, and with gutters D along the side edges, so that water will run from the middle part of the said floor into the gutters, and so that the droppings of the animals will fall into the said gutters, keeping the middle part of the floor dry and clean. In the gutters D, and at suitable distances apart, are placed ventilators E, which can be opened and closed by rods F passing out through the sides of the car. The animals are placed across the car, side by side, and with their heads alternately in opposite directions.

G are supports or slings, of cloth, leather, netting, or other suitable material, of such a width as to extend from the fore legs to the hind legs of the animals, and provided at their edges with hooks and rings, so that they can be adjusted to fit the bodies of the said animals. The ends of the supports or slings G are attached to the ends of chains H, the other ends of which have square hooks I formed upon them to fit upon the square rod J, so that the chains can be wound upon the said rod J by turning it. The journals of the rod J work in bearings K attached to the top of the car. The end of the rod J projects into a small apartment, L, formed in one end of the car for the attendant.

To the end of the rod J is attached a small gear-wheel, M, the teeth of which mesh into the teeth of the large gear-wheel N.

To the journal of the gear-wheel N is pivoted the end of a lever, O, to which is pivoted a pawl, P. The pawl P engages with the teeth of a large ratchet-wheel, Q, formed upon or attached to the large gear-wheel N, so that by operating the lever O the gear-wheels N M can be turned to turn the shaft J, wind up the chains H, and raise the supports G, and thus allow the animals to rest.

When it is desired to lower the supports G and allow the animals to bear their weight upon their feet the attendant lowers the lever O a little and presses the rods R upward with his foot to withdraw the holding-pawls S from the ratchet-wheel Q, which allows the gearing to be turned back to unwind the chains H.

If desired, the rods R may be replaced by cords and pulleys, so that the attendant can raise the pawls S by a downward pressure with his foot. Two pawls S are used, so that if one should give way the other may hold the wheel Q in place.

In the top of the car, just below the roof B, are formed water-tanks T, of galvanized sheet-iron or other suitable material, which are filled through spouts U from an opening in the top of the car, the said opening being closed by a cap, V.

From the tanks T pipes W lead down along the sides A of the car, so as to discharge the water into the buckets X. The pipes W are provided with stop-cocks Y, the stems of which extend out through the sides of the car, so that water can be admitted to the buckets X when desired. The buckets X are made scoop-shaped, and with perforated lugs upon their inner upper parts to receive the rods Z, upon which the said buckets are hinged, so that the said buckets can be slid along the said rods Z to allow two or more animals to use the same bucket. The buckets X are made with arms upon their outer ends, which, when the buckets are in position for use, project through openings in the sides A of the car, and rest against the doors *a* that close the said openings, as shown at the right-hand side of Fig. 1. When the doors *a* are closed the buckets X are forced inward and turned upon the rods Z, bringing their open inner ends against the inner surface of the sides of the car, as shown at the left-hand side of Fig. 1, so as to keep the said buckets clean.

To the rods Z, or to the sides of the car just above the said rods, are hinged racks $b$ to receive hay, straw, or other coarse food for the animals. The racks $b$ are supported at any desired inclination, or drawn close to the sides of the car, by chains $c$, which pass out through holes in the sides of the car, and are hooked upon hooks attached to the said sides. The racks $b$ are filled through holes in the sides of the car, which holes are closed by glass doors $d$. The doors $d$ serve as windows to give the animals light.

To the lower part of the sides A of the car are attached narrow platforms $e$, for the attendant to walk upon, and upon which he supports himself by taking hold of the hand-rails $f$, attached to the sides of the car a little above the doors $a$.

In the sides of the car, at one end, are formed doors $g$, through which the animals enter and leave the car, and which open into the end compartment.

In the upper part of the ends of the car are formed openings $h$ for the warm and impure air to escape, the fresh air entering through the bottom of the car.

To the middle part of the side edges of the slings or supports G are attached the ends of ropes or straps $i\,j$, which pass between the fore and the hind legs, respectively, of the animal, and their other ends are attached to the sides of the car, so as to hold the animals from swinging toward the sides of the car.

Having thus described my invention, I claim as new and desire to secure by Letters Patent—

1. In a stock-car, the combination of a sling, H, suspended across the car, suitable mechanism for raising and lowering it, and the connections $i\,j$, securing the sling to opposite sides of the car, all arranged substantially as shown and described.

2. The combination, with the sling-chain H, of the square hook I and the square rod J, the latter journaled in bearings K, as and for the purpose set forth.

3. In a stock-car, the combination, with a rod, J, for winding up the sling, of the gear M N, the lever O, the pivoted pawl P, the ratchet-wheel Q, the rods R, and the holding-pawls S, all arranged as described.

4. The combination, in a stock-car, of the hinged buckets having arms, the apertured car sides A and the doors $a$, whereby said arms project through the sides, rest against the doors, and are actuated by said doors to turn the buckets on their hinges, as and for the purpose specified.

CORODEN J. SLAFTER.

Witnesses:
Mrs. BELLE SLAFTER,
DANIEL W. ALLEN.